US012087058B2

(12) United States Patent
Athreya et al.

(10) Patent No.: US 12,087,058 B2
(45) Date of Patent: Sep. 10, 2024

(54) GLOBAL MOTION SUPPRESSION IN AN EVENT-DRIVEN CAMERA

(71) Applicant: Hewlett-Packard Development Company, L.P., Spring, TX (US)

(72) Inventors: Madhu Sudan Athreya, Palo Alto, CA (US); M. Anthony Lewis, Palo Alto, CA (US); Srikanth Kuthuru, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 48 days.

(21) Appl. No.: 17/429,960

(22) PCT Filed: Jun. 25, 2019

(86) PCT No.: PCT/US2019/038963
§ 371 (c)(1),
(2) Date: Aug. 11, 2021

(87) PCT Pub. No.: WO2020/263230
PCT Pub. Date: Dec. 30, 2020

(65) Prior Publication Data
US 2022/0108551 A1 Apr. 7, 2022

(51) Int. Cl.
*G06V 20/52* (2022.01)
*H04N 23/68* (2023.01)

(52) U.S. Cl.
CPC ......... *G06V 20/52* (2022.01); *H04N 23/6815* (2023.01); *H04N 23/684* (2023.01)

(58) Field of Classification Search
CPC ... G06V 20/52; H04N 23/6815; H04N 23/684
See application file for complete search history.

(56) References Cited

U.S. PATENT DOCUMENTS

| 5,020,890 | A | 6/1991 | Oshima et al. |
| 5,294,991 | A | 3/1994 | Oshima et al. |
| 7,132,824 | B2 | 11/2006 | Masuda et al. |
| 8,581,992 | B2 | 11/2013 | Hamada |

(Continued)

FOREIGN PATENT DOCUMENTS

| CN | 101193208 A | 6/2008 |
| CN | 102656876 A | 9/2012 |

(Continued)

OTHER PUBLICATIONS

Liu, M., et al., "ABMOF: A Novel Optical Flow Algorithm for Dynamic Vision Sensors", arxiv.org, Cornell University Library, 201 Olin Library Cornell University Ithaca, NY 14853, May 10, 2018, pp. 1-11.

(Continued)

*Primary Examiner* — Twyler L Haskins
*Assistant Examiner* — Fayez A Bhuiyan
(74) *Attorney, Agent, or Firm* — Quarles & Brady LLP

(57) ABSTRACT

Examples for global motion suppression in an event-driven camera are described herein. In some examples, global motion of an event-driven camera is detected based on a plurality of pixels of an event-driven image sensor detecting events. The global motion may be suppressed by event-driven image sensor circuitry in response to detecting the global motion.

20 Claims, 5 Drawing Sheets

(56) References Cited

U.S. PATENT DOCUMENTS

| | | |
|---|---|---|
| 9,319,614 B2 | 4/2016 | Shimada |
| 2007/0195175 A1 | 8/2007 | Silverbrook |
| 2008/0186386 A1 | 8/2008 | Okada et al. |
| 2009/0231449 A1* | 9/2009 | Tzur .................. H04N 5/145 |
| | | 348/208.6 |
| 2011/0085049 A1 | 4/2011 | Dolgin et al. |
| 2016/0323524 A1 | 11/2016 | Smith et al. |
| 2017/0195638 A1 | 7/2017 | Schofield et al. |
| 2017/0244917 A1 | 8/2017 | Beck |
| 2018/0262703 A1 | 9/2018 | Kim et al. |
| 2020/0294246 A1* | 9/2020 | Larson ................. G06V 20/40 |
| 2022/0030155 A1 | 1/2022 | Chen et al. |

FOREIGN PATENT DOCUMENTS

| | | |
|---|---|---|
| CN | 108574809 A | 9/2018 |
| CN | 109842767 A | 6/2019 |
| EP | 3910933 A1 | 11/2021 |
| WO | 2017/131343 A1 | 8/2017 |
| WO | WO-2017205597 A1 | 11/2017 |

OTHER PUBLICATIONS

Mitrokhin, A., et al., "Event-based Moving Object Detection and Tracking", arxiv.org, Cornell University Library, Olin Library Cornell University Ithaca, 14853, 2020, 8 pages.

* cited by examiner

GLOBAL MOTION SUPPRESSION IN AN EVENT-DRIVEN CAMERA

BACKGROUND

Computing devices are used to perform a variety of tasks, including work activities, banking, research, transportation, and entertainment. In some examples, computing devices may be used to capture and process sensing data. For instance, a camera may capture image data. In some examples, the camera may be an event-driven camera that detects changes in a scene.

BRIEF DESCRIPTION OF THE DRAWINGS

Various examples will be described below by referring to the following figures.

Figure 1:
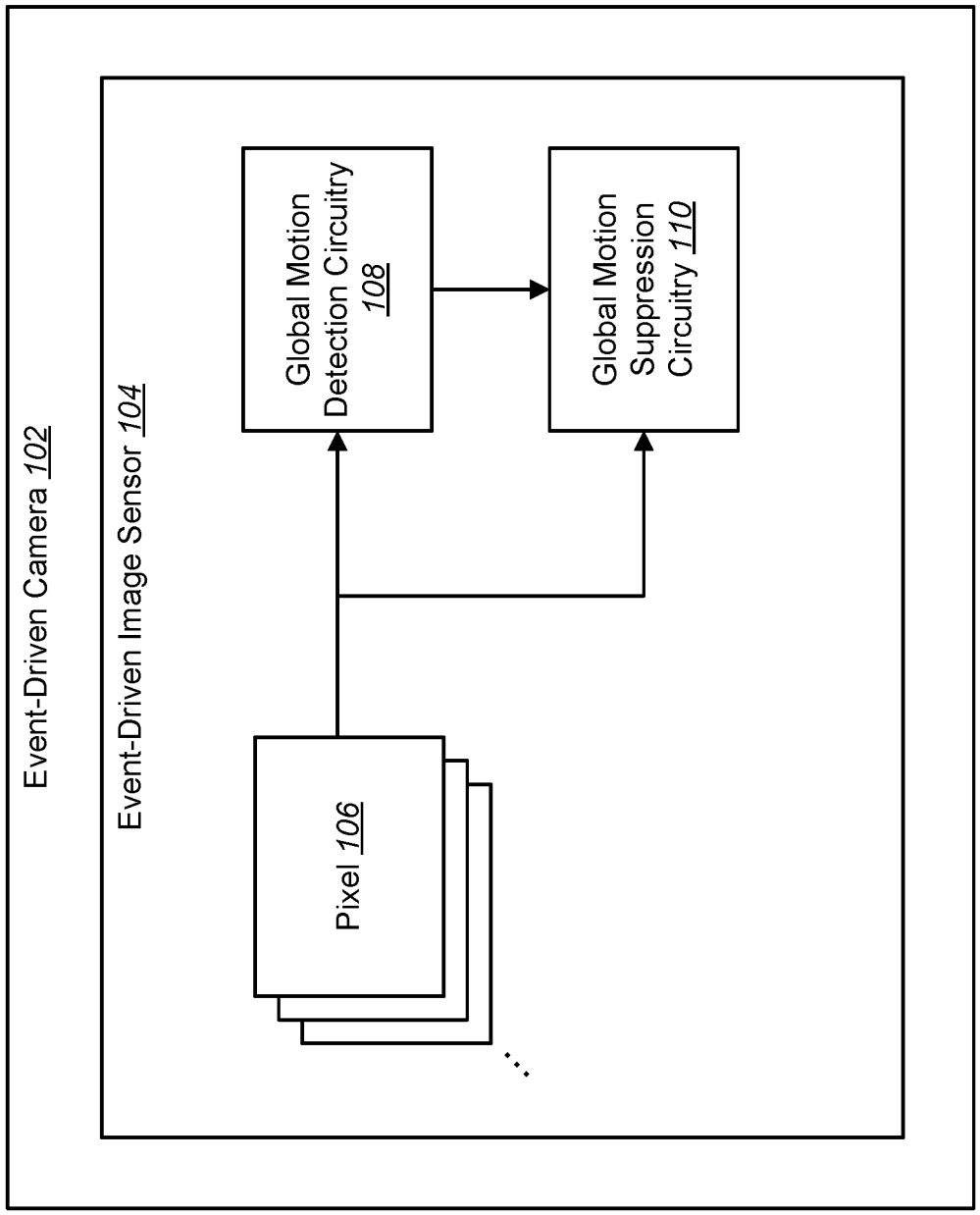
FIG. 1 is an example block diagram of an event-driven camera in which global motion suppression may be performed.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Examples of global motion suppression in an event-driven camera are described herein. In some examples, the event-driven camera registers motion that does not pertain to a subject in the field of view of the camera. This motion is global in nature and may arise from the camera's own motion versus the subject's motion. This global motion can be due to panning, jitter, and other forms of camera motion. Reading and processing pixel data during global motion may be inefficient. Examples of global motion suppression in an event-driven camera are described herein.

FIG. 1 is an example block diagram of an event-driven camera 102 in which global motion suppression may be performed. The event-driven camera 102 may be a stand-alone device or may be integrated into another electronic device (e.g., desktop computers, laptop computers, tablet devices, smart phones, cellular phones, game consoles, server devices, cameras, and/or smart appliances, etc.). Examples of applications that may use an event-driven camera 102 include thermal imaging in a 3D printer, print quality evaluation, virtual reality, autonomous vehicle navigation, and robotics.

An emerging paradigm in computing is event-driven processing, which is an aspect within the larger umbrella of brain-inspired computing, also referred to as neuromorphic computing. Event-driven processing bears a similarity to spiking and spike propagation within a human brain. Because the processing is triggered by events, the energy expended by an event-driven camera 102 may be significantly less when compared with non-event-driven systems. For example, in a frame-based camera, an entire image frame is read out periodically, even when changes between image frames are minimal. For example, an entire image frame may be read out and the pixels within the image frame may be processed even when most of the pixels remain unchanged. In comparison, in an event-driven image sensor 104, instead of periodically reading an image frame, individual pixels may be read upon detecting a change. In the context of image data, energy efficiency in cameras may be beneficial for continuous sensing at edge conditions and in cases where the cameras may be powered by a battery.

While an event-driven image sensor 104 may improve efficiency on the camera-capture side, a similar event-driven approach may be implemented for image processing. There are opportunities to vastly improve these systems in terms of computing efficiencies, by imitating biology and in particular, the human brain.

Event-driven cameras 102 offer several benefits over frame-based cameras. Event-driven cameras 102 are substantially more energy efficient, which results in orders of magnitude reduction in power consumption. The events being sparse results in storage, computing and bandwidth efficiencies. Additionally, event-driven cameras 102 enable a significant increase in dynamic range, which enables the detection of subtle image quality defects or face and/or object recognition that may be challenged by difficult illumination conditions including subject backlight. However, event-driven cameras 102 may encounter scenarios that compromise the energy storage, computing and bandwidth efficiencies as well as high dynamic range.

Event-driven cameras 102 work on the principle of capturing light when there is significant motion. In an event-driven camera 102, a pixel 106 may report an event when the pixel 106 is triggered by motion. For instance, when a person passes through the field of view (FOV), those pixels 106 over which motion is registered may be read out for processing, whereas the background pixels 106 where there is no motion will not be processed.

An event-driven camera 102 may detect motion through a process of pixel integration. As light (e.g., photons) contacts a pixel 106, the pixel 106 stores electrons in a pixel well. The amount of electrons stored in the pixel well is proportional to the amount of light sensed by the pixel 106. As used herein, pixel integration is a measurement of an amount of light (e.g., photons) that is sensed by a pixel 106 over a period of time (e.g., exposure time). In other words, pixel integration is a measurement of the stored charge accumulated within the pixel 106 during a specified time interval. In some examples, a pixel 106 may output a pixel integration signal (referred to herein as a pixel integration output) that indicates the pixel integration value.

Pixels 106 that register motion will do so upon reaching an event threshold during pixel integration. When high-frequency motion is detected, a pixel 106 integrates rapidly until it hits an event threshold. This may be referred to as a pixel firing. When the pixel 106 fires, the pixel output may be read out as an event. In an example, the pixel 106 may output a pixel fire signal when pixel integration reaches the event threshold. In other words, the pixel fire signal may be asserted when the pixel well threshold (referred to as the event threshold) is reached.

These events may be processed within the event-driven image sensor 104 as well as by downstream processing (e.g., spiking neural networks (SNN)). For instance, the downstream processing may be used to identify the person who passed through the FOV. This is useful for applications such as pedestrian detection, object recognition, and a wide variety of other applications. Event-based processing may also be useful when the device that is powering the event-driven image sensor 104 has a small battery. Additionally, event-based processing may be useful when the observed subject matter experiences a wide dynamic range, which may be beyond the capabilities of a frame-based camera sensor to detect.

While event-driven cameras 102 are very useful, there are common scenarios when their features may not provide the described benefits. These scenarios may arise when the event-driven camera 102 registers motion that does not pertain to the subject. This motion is global in nature in that the motion arises from camera's own motion and not the motion of the subject. This global motion can be due to panning of the event-driven camera 102, jitter (e.g., hand jitter), shaking, and other forms of camera motion.

When such a global motion happens, all the pixels 106 within the event-driven image sensor 104 register motion. All the pixels are then read out, processed and stored. However, in this case, the pixel readout, processing and storage are unwarranted. In other words, pixel readout, processing and storage during a global motion event provide no benefit in that the subject motion is not detected. When this happens, an event-driven camera 102 may become as inefficient as a frame-based camera.

Without suppressing global motion, the event-driven camera 102 may experience the following issues. There may be a sharp increase in power consumption. Since the power consumption in processing pixels 106 due to global motion is unnecessary, efficiency is impacted in an otherwise very efficient camera system. This unnecessary pixel processing also results in wasted power in other data paths, memory accesses and processing networks downstream of the event-driven image sensor 104. Additionally, the wasteful pixel processing may result in adversely impacting storage efficiency, hurting compression efficiency that arises out of a sparsity of events. Furthermore, the pixels 106 have a maximum electron-well (referred to as pixel-well) capacity. By integrating unnecessarily, pixel wells saturate more easily, which impacts the benefits of high dynamic range.

In some approaches, post-processing may be performed to detect the global motion at a later stage to help with processing for event detection. However, with these approaches the above described issues will not be overcome. In fact, the post-processing will result in further power consumption.

Examples of an event-driven camera 102 are described herein that include circuitry within the event-driven image sensor 104 to detect and suppress global motion in the pixel array. This may relieve the downstream stages of the event-driven camera 102 from having to carry, store and process the extra pixel data associated with global motion. This approach may also prevent premature saturation of pixel wells whenever global motion occurs.

The event-driven image sensor 104 includes a plurality of pixels 106. In an example, the pixels 106 are arranged in an array in which a number of pixels 106 form a row or pixels and a number of pixels 106 form a column of pixels.

It should be noted that an event-driven camera 102 may detect changes within the field of view of the event-driven image sensor 104. A given pixel 106 may output a pixel integration output signal and a pixel fire signal. The pixel integration output signal is an output signal that is asserted when the pixel 106 integrates. As used herein, the pixel integration output indicates an amount of light (e.g., photons) that is sensed by a pixel 106 over a period of time (e.g., exposure time). The pixel integration output may be used to detect low-frequency global motion.

The pixel fire signal is a signal that is asserted when the pixel well reaches an event threshold. The pixel fire signal may be used to detect high-frequency events.

In some examples, a pixel 106 may also receive a pixel reset signal. The pixel reset signal may be tied to a pixel 106, such that the pixel 106 gets reset whenever this reset signal is asserted. The pixel reset signal may cause the pixel 106 to discharge the pixel well, which results in the pixel integration output to reset.

The event-driven image sensor 104 may include global motion detection circuitry 108 to detect global motion of the event-driven camera 102 based on a plurality of pixels 106 of the event-driven image sensor 104 detecting events. In some examples, the global motion may include panning or jitter of the event-driven camera 102.

Global motion may be detected when a predetermined percentage of pixels 106 detect an event. In some examples, global motion may be detected if some predetermined number or percentage of pixels 106 is active. For example, global motion may be detected when all of the pixels 106 are active. In another example, global motion may be detected when a predetermined percentage (e.g., less than 100%) of pixels 106 are active.

In other examples, a predetermined subset of the pixels 106 may be used to detect and the global motion. For example, all edge pixels 106, every other pixel 106, every third pixel 106, etc., may be used to detect global motion. In this example, other pixels 106 may not be connected to the global motion detection circuitry 108.

The global motion detection circuitry 108 may receive the pixel integration outputs from each of the plurality of pixels 106. The global motion detection circuitry 108 may detect when the pixel integration outputs for each of the plurality of pixels 106 reach an event indication value. This may indicate that the pixels 106 have detected a low-frequency event (e.g., global motion). The event indication value may be a certain value of a pixel integration output that indicates that sufficient change has occurred in the pixel well to represent a change in the event-driven image sensor 104 field of view.

It should be noted that the event indication value may be less than the event threshold used to assert a pixel fire signal. For example, the pixel integration output may be less than the event threshold that would trigger a pixel fire. However, the pixel integration output may be used to detect low-frequency motion (e.g., global motion) that may otherwise not trigger a high-frequency event.

The global motion detection circuitry 108 may also include pixel integration delay components that delay when the pixel integration outputs reach the event indication value. For example, the pixel integration delay components may have a first time constant that is a large time constant to detect low-frequency global motion (e.g., panning). Because low-frequency global motion may be detectable over a longer period of time (as compared to a high-frequency event that would trigger an pixel fire signal), the large time constant of the pixel integration delay components may be used to delay when global motion is detected by the pixel 106. This may ensure that global motion detection is not asserted prematurely.

In an example, the pixel integration delay component may be implemented as a capacitor coupled to the pixel integration output of a pixel 106. An example of this approach is described in FIG. 3.

The event-driven image sensor 104 may also include global motion suppression circuitry 110. The global motion suppression circuitry 110 may suppress global motion in response to detecting the global motion. Suppressing the global motion by the global motion suppression circuitry 110 may include generating a global activation signal that prevents storing and processing data contained in the plurality of pixels 106. When all of the pixels 106 are triggered (e.g., the pixels 106 detect an event based on the pixel integration output), then the global motion suppression circuitry 110 may generate the global activation signal. When the global activation signal is output, this indicates that all pixels 106 have activated. For example, the global activation signal may be asserted when the event-driven camera 102 is experiencing global motion due to panning or jitter. The pixel values in this case may not be useful and thus could result in extra power consumption.

In some examples, the global activation signal may be used as a selector for pixel array read out and processing within the event-driven image sensor 104. For example, when the global activation signal is asserted (e.g., ON), then global motion is detected and the pixel data is not read out and/or processed. This will suppress the unnecessary and wasteful readout and processing of pixel data. When the global activation signal is de-asserted (e.g., OFF), then global motion is not detected and the pixel data may be read out and/or processed.

In some examples, suppressing the global motion may include resetting the plurality of pixels 106 in response to detecting the global motion. For instance, upon generating the global activation signal, a pixel reset signal may be sent to each of the plurality of pixels 106. When the global motion occurs, the pixels 106 may integrate unnecessarily. This global motion may cause the pixel wells to fill up sooner, and the pixels 106 to saturate faster. This scenario negatively impacts the dynamic range of the event-driven image sensor 104.

To preserve dynamic range, the global activation signal may be used to assert the reset signal, which is fed back to all the pixels 106 in the event-driven image sensor 104. The reset signal will cause the pixels 106 to empty the pixel wells. In some implementations a delay element may be included on the reset signal assertion to prevent race conditions between pixel integration and pixel reset. The reset signal provides a mechanism by which all the pixels 106 in the event-driven image sensor 104 can be reset whenever there is global motion. This may prevent premature saturation of the pixels 106, which improves the dynamic range of the event-driven image sensor 104.

The event-driven image sensor 104 may also include pixel fire detection circuitry. As described above, a high-frequency event may cause the pixel 106 to fire. A high-frequency event may be due to observable motion in the field of view of the event-driven image sensor 104. In other words, a high-frequency event may be meaningful information for the event-driven camera 102 to detect. When a high-frequency event is detected, a pixel 106 integrates rapidly until it hits an event threshold. The pixel 106 may output a pixel fire signal when pixel integration reaches the event threshold. When the pixel 106 fires, this should be recorded. Any global motion suppression that is in progress may be interrupted.

The pixel fire detection circuitry may detect when a pixel fire signal of a given pixel 106 reaches the event threshold. The pixel fire detection circuitry may reset the pixel integration output of the given pixel 106, which interrupts the global motion suppression. In other words, once one of the plurality of pixels 106 is no longer outputting a pixel integration output equal to or greater than the event indication value, the global motion suppression circuitry 110 may cease to assert the global activation signal. When the global activation signal is de-asserted (e.g., OFF), then global motion is not detected and the pixel data may be read out and/or processed.

In an example, the pixel fire detection circuitry may include a pixel fire delay component having a second time constant that is less than the first time constant of the pixel integration delay component. As described above, the pixel integration delay components may have a large time constant to avoid prematurely asserting global motion detection. However, to avoid missing a meaningful event, the pixel fire event may be detected quickly as compared to the global motion detection. In other words, high-frequency motion that triggers an event may be detected quickly to avoid missing the event. Therefore, the time constant for the pixel fire delay component may be very small when compared with the first time constant of the pixel integration delay component. In an example, the pixel fire delay component may be implemented as a capacitor coupled to the pixel fire signal of a pixel 106. An example of this approach is described in FIG. 3.

Some additional aspects of global motion suppression in an event-driven camera 102 are described herein. Examples of circuitry to detect and suppress global motion is described in connection with FIG. 3 and FIG. 4. An example of a global pixel reset signal that is asserted in response to detecting global motion is described in connection with FIG. 5.

Figure 2:
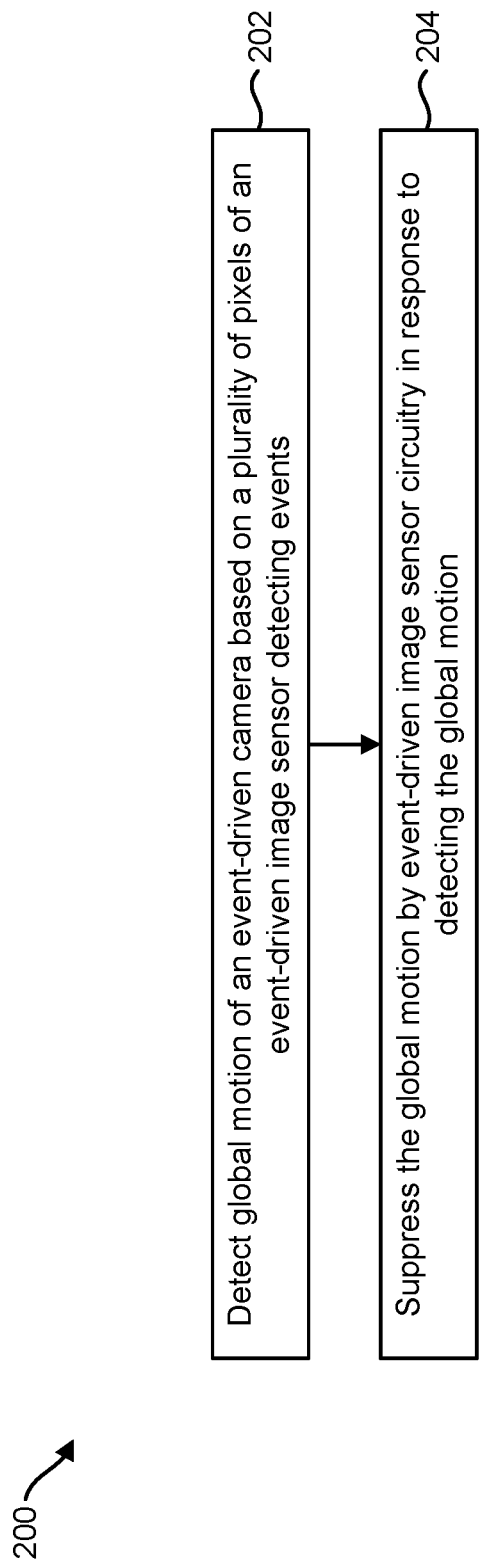
FIG. 2 is an example flow diagram illustrating a method for global motion suppression in an event-driven camera.

FIG. 2 is an example flow diagram illustrating a method 200 for global motion suppression in an event-driven camera 102. The event-driven camera 102 may include an event-driven image sensor 104 with a plurality of pixels 106. The pixels 106 may each provide a pixel integration output.

The event-driven image sensor 104 may detect 202 global motion of the event driven camera 102 based on the plurality of the pixels 106 of the event-driven image sensor 104 detecting events. For example, the event-driven image sensor 104 may include global motion detection circuitry 108 to detect when the pixel integration outputs for a predetermined percentage of the plurality of pixels 106 reach an event indication value. In some implementations, the global motion detection circuitry 108 may detect 202 global motion when the pixel integration outputs for all pixels 106 reach an event indication value.

In some examples, the global motion detection circuitry 108 may also include pixel integration delay components having a first time constant for each of the plurality of pixels 106. The first time constant for the pixel integration delay components may be a large time constant. The pixel integration delay components may delay when the pixel integration outputs reach the event indication value. This delay may enable the event-driven image sensor 104 to detect low-frequency global motion (e.g., panning and/or jitter).

The event-driven image sensor 104 may suppress the global motion in response to detecting the global motion. For example, the event-driven image sensor 104 may include global motion suppression circuitry 110 to generate a global activation signal when the pixel integration outputs for each of the plurality of pixels 106 reach the event indication value. The global activation signal may prevent storing and processing data contained in the plurality of pixels 106. The global motion suppression circuitry 110 may also reset the plurality of pixels 106. For example, upon detecting global motion, the global motion suppression circuitry 110 may send a reset signal to the plurality of pixels 106.

Figure 3:
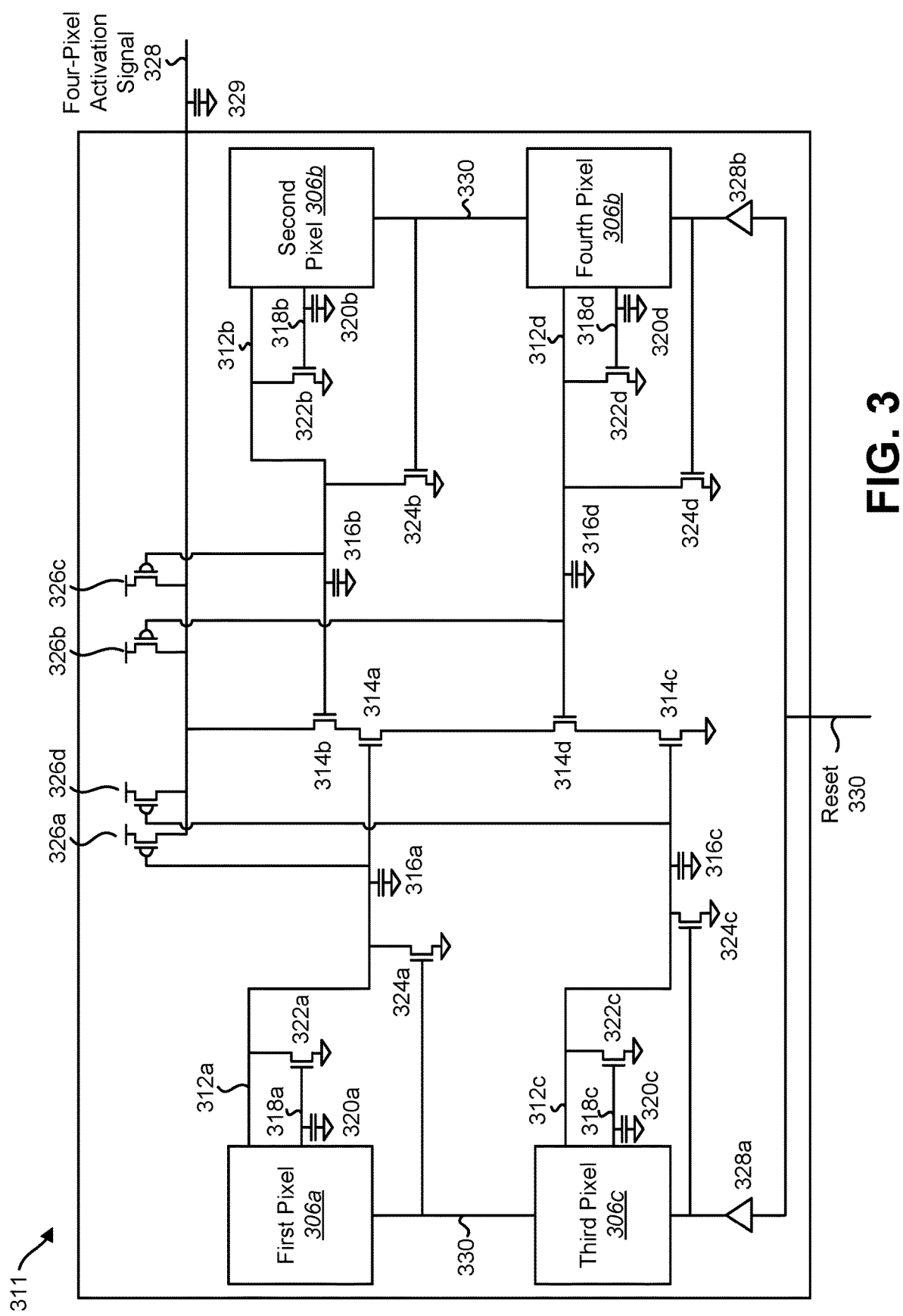
FIG. 3 is an example of a four-pixel module for global motion suppression in an event-driven camera.

FIG. 3 is an example of a four-pixel module 311 for global motion suppression in an event-driven camera. The four-pixel module 311 is an example of the global motion detection circuitry and global motion suppression circuitry described in connection with FIG. 1.

In this example, four pixels 306a-d are assembled into an array to form a four-pixel module 311. Each pixel 306 outputs a pixel integration output signal 312 that is asserted when the pixel 306 integrates. As described above, pixel integration is a measure of the amount of light sensed by the pixel 306 over a period of time. Therefore, the pixel integration may be a measurement of the stored charge accumulated within the pixel 306 during a specified time interval. The pixel integration output signals 312a-d may be referred to as a pixel activation signal. In some examples, the pixel integration output signals 312a-d may include a voltage corresponding to the pixel integration value, where the voltage increases as the pixel integration value increases.

The pixels 306a-d also output a pixel fire signal 318. The pixel 306 may output a pixel fire signal when pixel integration reaches the event threshold. In other words, the pixel fire signal 318 may be asserted when the pixel well threshold (referred to as the event threshold) is reached.

The pixels 306a-d may receive a reset signal 330. Upon receiving the reset signal 330, the pixels 306a-d may reset. For example, the charge accumulated within the electron well may be discharged.

In this four-pixel module 311, the pixel integration output signal 312 from each pixel 306 controls the gate input of a negative channel metal oxide (NMOS) transistor 314. The four NMOS transistors 314a-d are connected in series to form a NAND (NOT-AND) gate. In other words, the global motion detection circuitry may include a NAND gate. The inputs of the NAND gate may be coupled to the pixel integration outputs 312a-d of the plurality of pixels 306a-d.

A positive channel metal oxide (PMOS) transistor 326a-d may be used to pull up the line (i.e., the four-pixel activation signal 328) when the NMOS transistors 314a-d are not turned ON. Thus, the pixel integration output signal 312a-d may be coupled to the gates of the PMOS transistors 326a-d connected in parallel. In an example, the full circuitry may constitute a complementary MOS (CMOS) NAND gate.

An inverted output from this gate may be the four-pixel activation signal 328. When the four-pixel activation signal 328 is asserted (e.g., ON), this indicates all inputs to the gates of the NMOS transistors 314a-d are ON. In other words, when the four-pixel activation signal 328 is asserted, each of the event-driven pixels 306a-d has been activated. If the four-pixel activation signal 328 is OFF, this implies a pixel(s) 306 has not sensed an event. The inverted output of the NAND gate is ON when all inputs to the NAND gate reach the event indication value. The global motion suppression circuitry generates the four-pixel activation signal 328 when the inverted output of the NAND gate is ON.

In an example, the NMOS transistors 314a-d are pull down transistors connected to the pixel integration output signal 312a-d of the four pixels 306a-d. The gates of the NMOS transistors 314a-d are controlled by capacitors 316a-d. The gate of a NMOS transistor 314 turns on when the voltage across the input capacitor 316 crosses the threshold voltage of the respective NMOS transistor 314.

The capacitors 316a-d may be trickle charge capacitors with a large time constant. The capacitors 316a-d may be used to detect low-frequency global motion (e.g., panning).

These capacitors 316a-d charge whenever their respective pixels 306a-d integrate. For example, the capacitors 316a-d may charge based on the voltage associated with the pixel integration output signal 312a-d.

In some examples, the output four-pixel activation signal 328 of the four-pixel array may traverse large distances, and hence may have higher parasitics. The PMOS transistors 326a-d may be P type pull up transistors that ensure the output state of the four-pixel activation signal 328 is held and is not susceptible to leakage through the parasitics.

A high-frequency event may cause a pixel 306 to fire. This happens when the pixel 306 integrates rapidly until it hits an event threshold. This is referred to as a pixel firing. When this pixel 306 fires, this may be meaningful and should be recorded. Any global motion suppression that is in progress may be interrupted. In an example, this may be accomplished by charging capacitors 320a-d that are coupled to the pixel fire signals 318a-d. When the voltage at the gate of the NMOS transistors 322a-d reaches the threshold value of the NMOS transistors 322a-d, the NMOS transistors 322a-d are turned ON. This results in a path to ground to discharge respective capacitors 316a-d on the pixel integration output 312a-d, removing any charge accumulation due to prior global motion events. The pixel fire event may be detected quickly, as compared to the global motion events. Therefore, the time constant for the pixel fire capacitors 320a-d may be very small when compared with the time constant for the pixel integration capacitors 316a-d.

When all four pixels 306a-d have detected a global motion (i.e., when all four NMOS transistors 314a-d are ON), this results in the 4-pixel global motion detection logic to turn ON. In this case, an output signal capacitor 329 may be charged and the four-pixel activation signal 328 is asserted. In the case of a 4-pixel module, this four-pixel activation signal 328 is an example of the global activation signal described in connection with FIG. 1. The four-pixel activation signal 328 may also be referred to as a four-pixel activation output.

In some examples, the 4-pixel module may also include a reset signal 330. The value of the reset signal 330 may be stored in buffers 328a-b. The reset signal 330 may be coupled to a reset input of the pixels 306a-d. When the reset signal 330 is asserted (e.g., ON), the pixels 306a-d may be reset.

The reset signal 330 may also be coupled to the gate of the NMOS transistors 324a-d. When the voltage at the gate of the NMOS transistors 324a-d reaches the threshold value of the NMOS transistors 324a-d, the NMOS transistors 324a-d are turned ON. This results in a path to ground to discharge respective capacitors 316a-d on the pixel integration output 312a-d, removing any charge accumulation due to prior global motion events, which resets the global motion detection.

It should be noted that even though FIG. 3 shows a grouping of four pixels 306a-d, different group sizes may be chosen depending on design needs. For example, a pixel module may include 2 pixels, 3 pixels, 5 pixels, and so forth. This may be referred to as n-pixel grouping, where "n" is a variable number of pixels 306.

Figure 4:
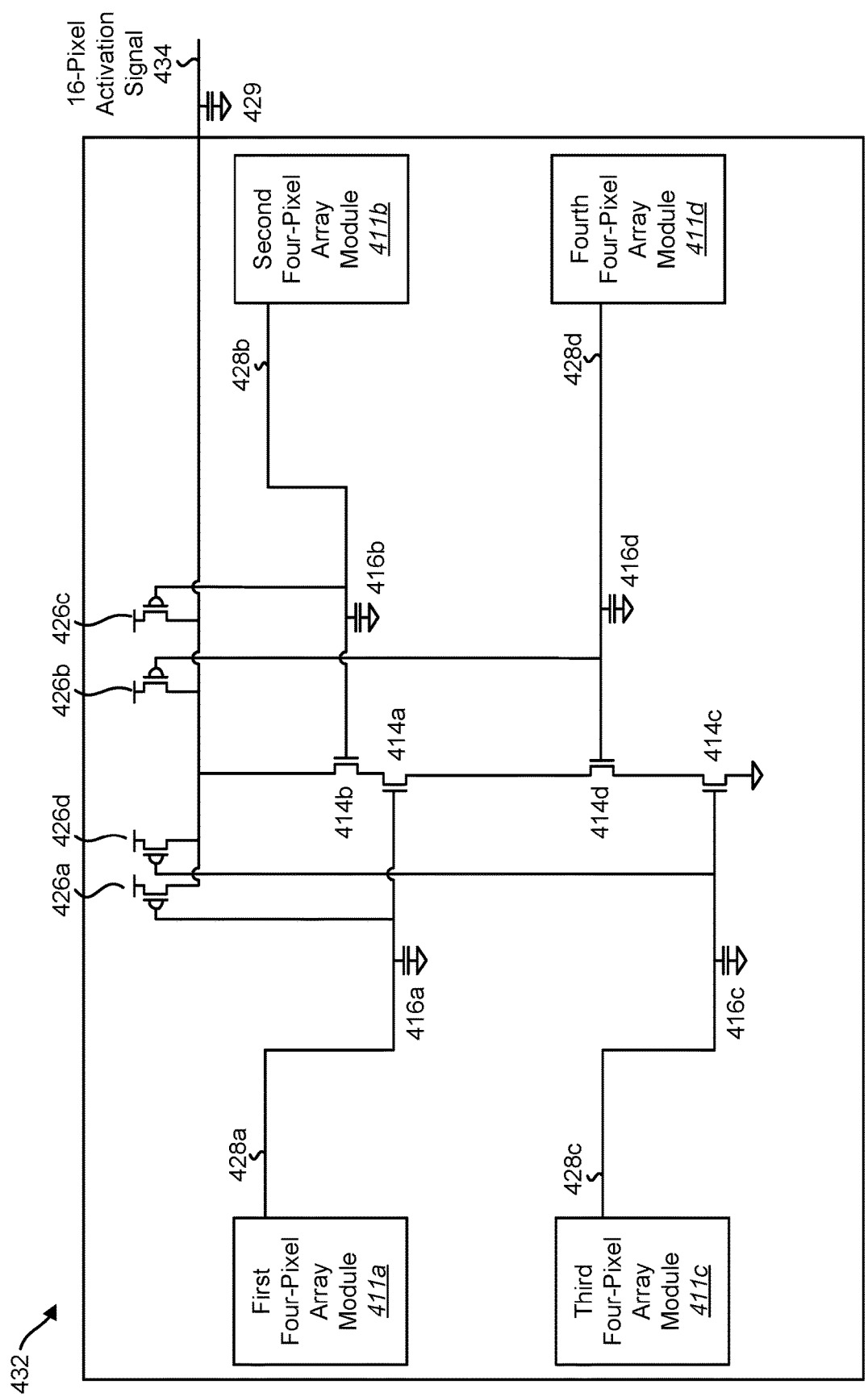
FIG. 4 is an example of a 16-pixel array module for global motion suppression in an event-driven camera.

FIG. 4 is an example of a 16-pixel array module 432 for global motion suppression in an event-driven camera. As described above, n-pixel grouping may be used to build macro groups of pixels. In this example, 4 four-pixel array modules 411a-d are grouped together to form a 16-pixel array module 432. The four-pixel array modules 411a-d of FIG. 4 may be implemented as the four-pixel array modules 311a-d described in FIG. 3. The functionality of the 16-pixel array module 432 may be similar to the four-pixel array modules 311 as described in FIG. 3.

In this example, each four-pixel array module 411 may include four pixels and circuitry to output a four-pixel activation signal 428. In this example, the four-pixel array modules 411a-d are assembled into an array to form a 16-pixel array. Each four-pixel array module 411 outputs a four-pixel activation signal 428 that is asserted when each of the pixels integrates.

In this example, the four-pixel activation signals 428a-d from each four-pixel array module 411 control the gate inputs of NMOS transistors 414a-d. The four NMOS transistors 414a-d are connected in series to form a NAND gate. PMOS transistors 426a-d may be used to pull up the line (i.e., the 16-pixel activation signal 434) when the NMOS transistors 414a-d are not turned ON. Thus, the four-pixel activation signals 428a-d may be coupled to the gates of the into the PMOS transistors 426a-d connected in parallel.

An inverted output from the gates of the PMOS transistors 426a-d may be the 16-pixel activation signal 434. When the 16-pixel activation signal 434 is asserted (e.g., ON), this indicates all inputs to the gates of the NMOS transistors 414a-d are ON. In other words, when the 16-pixel activation signal 434 is asserted, each of the 16 event-driven pixels within the 16-pixel array module 432 has been activated. If the 16-pixel activation signal 434 is OFF, this implies a pixel(s) has not sensed an event.

In an example, the NMOS transistors 414a-d are pull down transistors connected to the pixel integration output signal 412a-d of the four pixels 406a-d. The gates of the NMOS transistors 414a-d are controlled by capacitors 416a-d. The gate of a NMOS transistor 414 turns on when the voltage across the input capacitor 416 crosses the threshold voltage of the respective NMOS transistor 414. The capacitors 416a-d may be trickle charge capacitors with a large time constant. The capacitors 416a-d may be used to detect low-frequency global motion (e.g., panning). These capacitors 416a-d charge whenever a four-pixel activation signal 428 is asserted.

When each of the four-pixel array modules 411a-d have detected a global motion (i.e., when all four NMOS transistors 414a-d are ON), this results in the 16-pixel global motion detect logic to turn ON. In this case, an output signal capacitor 429 may be charged and the 16-pixel activation signal 434 is asserted.

In some examples, the 16-pixel array module 432 may be used to build a 64-pixel array module. A 64-pixel array module may be used to build a 256-pixel array module, and so on. At each stage, when the N-pixel activation output is asserted, this implies that all pixels within the module have sensed an event.

The output of a pixel in an event-driven camera will fire upon activation. With the pixel array modules described herein, each module can detect when all pixels within the module are activated. With this hierarchical arrangement, the activation at every module is propagated to the larger module. Thus, an entire pixel array activation maybe detected. The signal that is asserted when the entire pixel array activates is the global activation signal.

Figure 5:
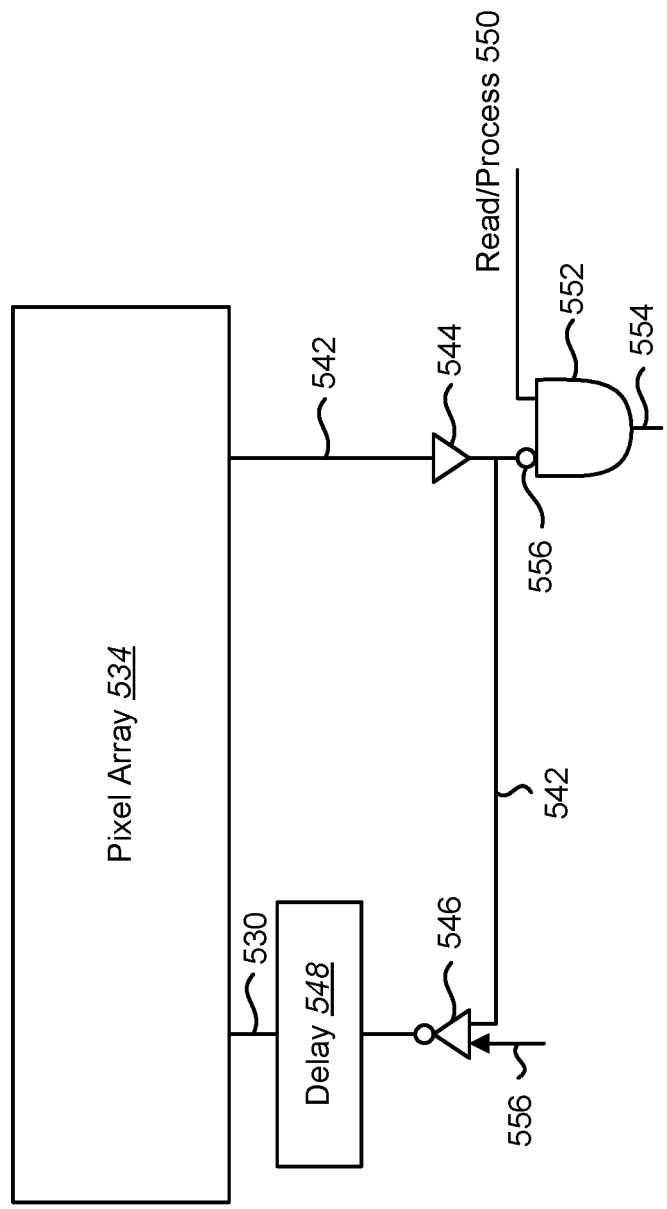
FIG. 5 is an example illustrating a reset signal and a global activation signal for a pixel array.

FIG. 5 is an example illustrating a global activation signal 542 and a reset signal 530 for a pixel array 540. The pixel array 540 may include a number of pixel array modules as described in connection with FIG. 3 and FIG. 4. The pixel array 540 may output a global activation signal 542 when all of the pixels in the pixel array 540 detect an event.

In an example, the value of the global activation signal 542 may be stored in a buffer 544. The global activation signal 542 may be provided to an AND gate 552. An inverter 556 at an input of the AND gate 552 may invert the global activation signal 542. The AND gate 552 may also receive a read/process signal 550, which instructs an event-driven camera to read out and process pixel data.

When the global activation signal 542 is OFF (i.e., global motion is not detected), then the AND gate 552 outputs a read/process signal 554 that matches the state of the input read/process signal 550. When the global activation signal 542 is ON (i.e., global motion is detected), then the AND gate 552 outputs the read/process signal 554 as OFF even if the input read/process signal 550 is ON.

The global activation signal 542 may be used to activate a reset signal 530. In an example, the global activation signal 542 may be provided to a buffer 546 that stores the state of the global activation signal 542. A reset signal 530 may be fed back to all the pixels in the pixel array 540. The reset signal 530 may be asserted (e.g., ON) when the global activation signal 542 is asserted (e.g., ON). The reset signal 530 may cause the pixels to empty their pixel wells. This provides a mechanism by which all the pixels in the pixel array 540 can be reset whenever there is global motion. This may prevent premature saturation of the pixel wells, which may improve the dynamic range of the event-driven image sensor.

In some examples, a reset signal 556 may be provided by other sources. For example, the reset signal 556 may be asserted by other components of the event-driven image sensor or event-driven camera.

In some implementations a delay component 548 may be included on the reset signal assertion. The delay component 548 may delay when the reset signal 530 is asserted. In other words, the delay component 548 may delay when the reset signal 530 is sent to the pixel array 540. This may prevent race conditions between pixel integration and pixel reset.

The reset condition may be maintained as long as there is global motion. When a non-global motion event is detected (e.g., when a pixel fire occurs), the pixel(s) will de-assert the pixel activation signal (e.g., pixel integration output signals 312), which propagates through the hierarchy of gates to de-assert the global activation signal 542. This allows further pixel read/process tasks. The de-assertion of the global activation signal 542 also causes the reset signal 530 to de-assert, causing the pixels to accumulate charge.

The invention claimed is:

1. A method, comprising:
   detecting global motion of an event-driven camera based on a plurality of pixels of an event-driven image sensor detecting events;
   suppressing the global motion by event-driven image sensor circuitry by:
      generating a global activation signal in response to detecting the global motion, and
      preventing pixel data of the plurality of pixels that is generated during the global motion from being processed in response to the global activation signal;
   detecting a pixel fire signal when a given signal of the plurality of pixels reaches an event threshold indicative of an event in a field of view of the event-driven camera; and
   reading out event pixel data of the given pixel in response to detection of the pixel fire signal.

2. The method of claim 1, wherein suppressing the global motion by the event-driven image sensor circuitry comprises preventing the pixel data of the plurality of pixels from being stored in response to the global activation signal.

3. The method of claim 2, wherein the global activation signal is used as a selector for pixel array read out and processing within the event-driven image sensor.

4. The method of claim 1, wherein suppressing the global motion by the event-driven image sensor circuitry comprises resetting the plurality of pixels in response to detecting the global motion.

5. The method of claim 1, wherein the global motion comprises panning or jitter of the event-driven camera.

6. The method of claim 1, wherein global motion is detected when a predetermined percentage of pixels detect an event.

7. The method of claim 1, further comprising:
detecting a high-frequency event while suppressing the global motion; and
interrupting the global motion suppression.

8. An event-driven image sensor, comprising:
global motion detection circuitry to detect global motion of an event driven camera based on a plurality of pixels of the event-driven image sensor detecting events; and
global motion suppression circuitry to suppress the global motion in response to detecting the global motion, wherein, to suppress the global motion in response to detecting the global motion, the global motion suppression circuitry is to:
generate a global activation signal upon detection of global motion, and
prevent a plurality of pixel data of the plurality of pixels from being stored and processed,
wherein a readout of a pixel of the plurality of pixels of the event-driven image sensor is event-triggered based on a pixel integration output of the pixel of the plurality of pixels indicating an event.

9. The event-driven image sensor of claim 8, wherein the global motion detection circuitry comprises circuitry to detect when pixel integration outputs for all pixels in the event-driven image sensor reach an event indication value.

10. The event-driven image sensor of claim 9, wherein the global motion detection circuitry further comprises pixel integration delay components having a first time constant for each of the plurality of pixels to delay when the pixel integration outputs reach the event indication value.

11. The event-driven image sensor of claim 10, wherein the event-driven image sensor further comprises pixel fire detection circuitry to:
detect when a pixel fire signal of a given pixel reaches an event threshold, and
reset the pixel integration output of the given pixel, thereby interrupting the global motion suppression,
wherein the pixel fire detection circuitry comprises a pixel fire delay component having a second time constant that is less than the first time constant of the pixel integration delay component.

12. The event-driven image sensor of claim 9, wherein the global motion suppression circuitry comprises circuitry to:
generate the global activation signal when the pixel integration outputs for a predetermined percentage of pixels reach the event indication value, and
reset the plurality of pixels.

13. An event-driven image sensor, comprising:
a plurality of pixels each comprising a pixel integration output, wherein the pixel integration output comprises an amount of light sensed by a pixel over a period of time;
global motion detection circuitry to detect when pixel integration outputs for each of the plurality of pixels reach an event indication value; and
global motion suppression circuitry to generate a global activation signal when the pixel integration outputs for each of the plurality of pixels reach the event indication value, wherein the global activation signal prevents storing and processing data contained in the plurality of pixels, and to reset the plurality of pixels.

14. The event-driven image sensor of claim 13, wherein the global motion detection circuitry comprises a NAND gate, wherein inputs of the NAND gate are coupled to the pixel integration outputs of the plurality of pixels.

15. The event-driven image sensor of claim 14, wherein an inverted output of the NAND gate is ON when all inputs to the NAND gate reach the event indication value, and wherein the global motion suppression circuitry generates the global activation signal when the inverted output of the NAND gate is ON.

16. The event-driven image sensor of claim 13, wherein the event indication value comprises a pixel integration output value indicating a sufficient change in a field of view.

17. The event-driven image sensor of claim 13, wherein the global motion detection circuitry comprises a logic gate, wherein inputs of the logic gate are coupled to the pixel integration outputs of the plurality of pixels.

18. The event-driven image sensor of claim 17, wherein the global motion suppression circuitry generates the global activation signal in response to an output of the logic gate.

19. The method of claim 1, wherein generating the global activation signal in response to detecting the global motion includes generating the global activation signal when pixel integration outputs for the first plurality of pixels reach an event indication value, wherein the event indication value is less than the event threshold.

20. The event-driven image sensor of claim 13, further comprising pixel fire detection circuitry to
detect when the pixel integration output of a given pixel of the plurality of pixels reaches an event threshold indicative of an event in a field of view of the event-driven image sensor; and
in response to the detection, cause readout of event pixel data of the given pixel.

* * * * *